Dec. 11, 1928.
P. S. MARTIN
1,694,513
AUTOMATIC TEMPERATURE CONTROLLING DEVICE FOR INCUBATORS
Original Filed Sept. 23, 1920
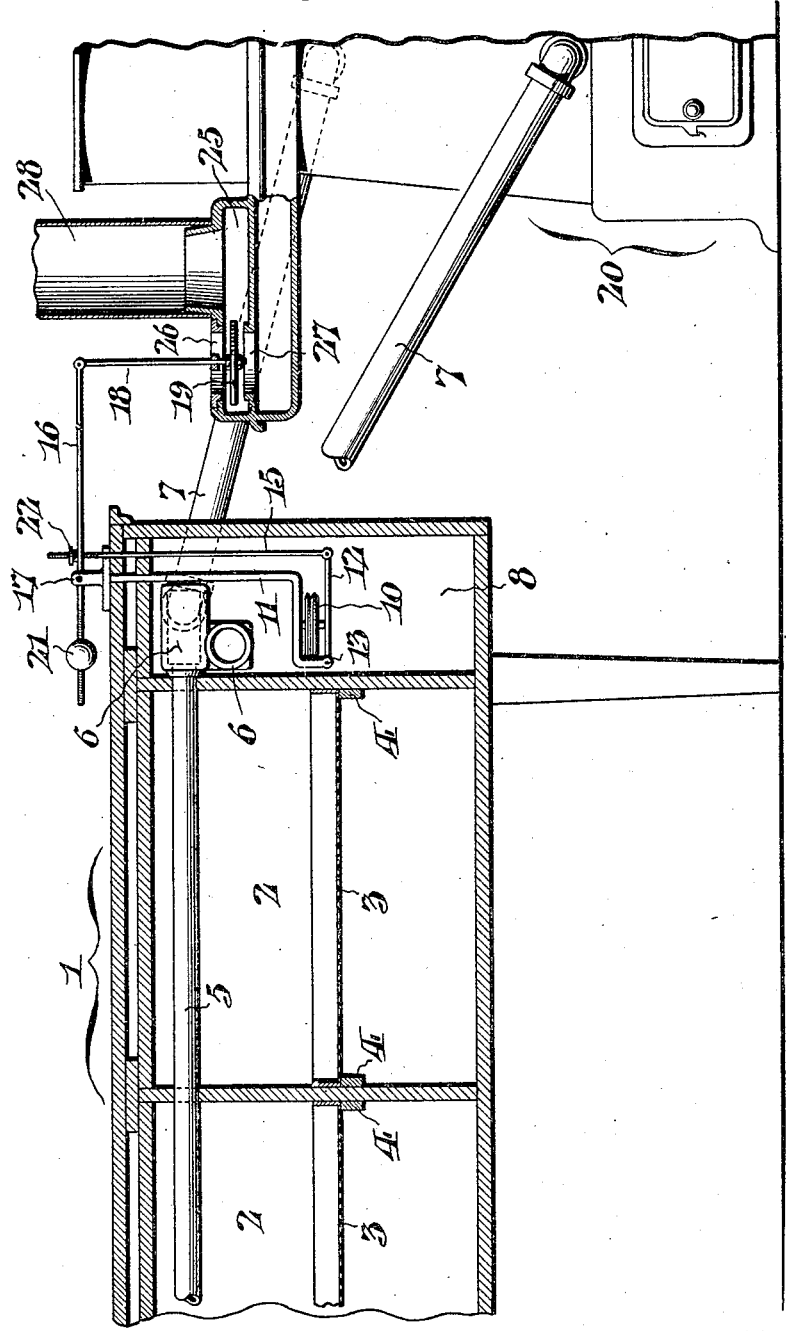
WITNESSES:
John C. Bergner
James H. Bell
INVENTOR:
Perry S. Martin,
BY Jelley & Paul.
ATTORNEYS.

Patented Dec. 11, 1928.

1,694,513

UNITED STATES PATENT OFFICE.

PERRY STOVER MARTIN, OF HARRISONBURG, VIRGINIA.

AUTOMATIC TEMPERATURE-CONTROLLING DEVICE FOR INCUBATORS.

Application filed September 23, 1920, Serial No. 412,258. Renewed August 11, 1926.

The invention relates more specifically to primary temperature controlling devices such as are useful in connection with multiple compartment incubators and the like of the type shown in Patent No. 1,283,402, for the purpose of maintaining automatically, a predetermined average uniform temperature about the eggs throughout the incubation period.

Heretofore in attempting to maintain an unvarying incubation temperature at the egg level in multiple compartment incubators employing hot water as a heating medium, it has generally been the custom to maintain the temperature of the water constant, either by means of regulators of the expansion tank type, or by thermostats directly interposed in the circulating system. I have found that this principle of operation is faulty since in order to maintain the proper incubation temperature against the modifying influence of changes in the outside atmosphere surrounding the incubator, it is necessary that the temperature of the heating medium be either raised or lowered in compensating for such external changes. Accordingly, regulators of the above type could not be absolutely relied upon without continual readjustment, thus necessitating constant care and alertness on the part of the operative.

The object of my invention is to overcome these difficulties, and this I accomplish by automatically controlling the functioning of the heater associated with the incubator in such manner as to effect increases or decreases in the temperature of the heating medium complementarily to changes in the external atmosphere so that an average unvarying incubation temperature is positively maintained about the eggs within the incubator, the precise incubation temperature in each compartment of the incubator being regulated by individual controlling devices.

The advantages of my invention will become readily apparent from the detailed description which follows.

In the drawing, I have illustrated more or less diagrammatically, a portion of an incubator together with an associated hot water heater conveniently illustrating my invention.

The incubator herein represented and designated comprehensively by the numeral 1, is of a multiple compartment type comprising a number of separate incubation compartments 2 which, as clearly suggested, are arranged as a horizontal series, each of said compartments being provided with the usual egg tray 3, which is slidably mounted upon supporting guides 4. The structure is internally heated by means of a longitudinally running bank of pipe coils 5 connected at their ends by manifolds 6, which are in turn communicative with the heater through flow pipes 7. These manifolds are located in separate auxiliary chambers at the ends of the incubator structure, one of such chambers being shown at 8 in the illustration. Within the chamber 8 at a level corresponding to that of the egg trays, is mounted a thermostat 10, supported by a bracket 11, and which is operative upon a multiplying lever 12 fulcrumed at 13 to said bracket. To the outer end of the lever 12 is pivotally connected a rod 15, which extends to the exterior through the top of the incubator, and actuates an arm 16, pivoted at 17. To one extremity of said arm is connected a rod 18, which supports at its lower end, the damper disk 19 of the heater 20. Upon the opposite extremity of the arm 16 is mounted an adjustable weight 21 useful as a counterbalance, so as to necessitate very little effort on the part of the thermostat in effecting movement of the arm. In order that the leverage system subject to the thermostat may be set so as to function at any predetermined temperature, the connection between the rod 15 and the lever 16 is preferably made adjustable,—this being accomplished by means of a thumb nut 22, which has threaded engagement with the rod end. The damper of the heater is operative in the interspace 25 between a check draft opening 26, which communicates directly with the exterior, and a main draft opening 27, which communicates directly with the flue 28 when the opening 26 is completely closed. In all other respects, the heater herein illustrated is similar to that shown and described in U. S. Patent, No. 1,236,731, granted me under date of August 14, 1917, and hence need not be further detailed herein.

In operation, any external temperature changes tending to effect the general predetermined temperature within the incubator will immediately influence the thermostat 10. This will accordingly cause the shifting of the damper disk 19 of the heater so that its draft is either increased or reduced and the water of the system correspondingly raised or lowered to automatically meet the contingency. The thermostat 10, on account of its being located within the incubator at the egg level is subject only to conditions which affect the temperature at said level. Furthermore, in view of the complete isolation of the chamber 8, the thermostat 10 is affected only by general temperature conditions within the incubator and not directly by local conditions obtaining in any one of the various incubation compartments.

From the above, it will be seen that the temperature of the heating medium is so controlled as to produce the correct incubation temperature at the egg level, instead of being maintained at a fixed point irrespective of the temperature at the egg level as heretofore practiced.

In the claims, I have employed the terms "master temperature controlling device" in distinguishing from the individual type of regulator ordinarily used in the various incubation compartment for controlling local temperature conditions only.

Having thus described my invention, I claim:

1. The combination with an incubator having associated therewith a heater, and comprising a multiplicity of separate incubator compartments, an auxiliary chamber completely isolated from said incubation compartments, and a primary temperature controlling device located at the egg level within said auxiliary chamber, said device including a thermostat and coordinated means for governing the draft of the heater and thereby automatically controlling the temperature of the heating medium.

2. The combination with a multiple compartment incubator heated by a system of hot water pipes connected to an associated heater, of an auxiliary chamber for the accomodation of the manifolds of said pipes, a primary temperature controlling device located at the egg level within said auxiliary chamber, said device comprising a thermostat and a coordinated multiplying leverage adapted to govern the draft of the heater and thereby automatically control the temperature of the heating medium.

In testimony whereof, I have hereunto signed my name at Harrisonburg, Va., this seventeenth day of September, 1920.

PERRY STOVER MARTIN.